United States Patent
Hum et al.

(10) Patent No.: US 7,457,924 B2
(45) Date of Patent: *Nov. 25, 2008

(54) HIERARCHICAL DIRECTORIES FOR CACHE COHERENCY IN A MULTIPROCESSOR SYSTEM

(75) Inventors: Herbert H. J. Hum, Portland, OR (US); James R. Goodman, Madison, WI (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/482,673

(22) Filed: Jul. 6, 2006

(65) Prior Publication Data

US 2006/0253657 A1    Nov. 9, 2006

Related U.S. Application Data

(63) Continuation of application No. 10/326,234, filed on Dec. 19, 2002, now Pat. No. 7,130,969.

(51) Int. Cl.
*G06F 12/00* (2006.01)

(52) U.S. Cl. .................. 711/141; 711/146
(58) Field of Classification Search .......... 711/141, 711/146; 709/216, 230, 238
See application file for complete search history.

(56) References Cited

U.S. PATENT DOCUMENTS

| 5,664,149 | A | * | 9/1997 | Martinez, Jr. et al. ....... 711/141 |
|---|---|---|---|---|
| 5,819,296 | A | * | 10/1998 | Anderson et al. ........... 707/204 |
| 5,860,111 | A | * | 1/1999 | Martinez, Jr. et al. ....... 711/143 |
| 6,009,488 | A | | 12/1999 | Kavipurapu |
| 6,275,905 | B1 | | 8/2001 | Keller et al. |
| 6,341,337 | B1 | * | 1/2002 | Pong ........................ 711/146 |
| 6,430,657 | B1 | * | 8/2002 | Mittal et al. ................. 711/138 |
| 6,457,100 | B1 | * | 9/2002 | Ignatowski et al. ......... 711/119 |
| 6,477,535 | B1 | | 11/2002 | Mirzadeh |
| 6,631,447 | B1 | * | 10/2003 | Morioka et al. ............. 711/141 |
| 6,760,728 | B1 | * | 7/2004 | Osborn ........................ 707/10 |
| 6,877,026 | B2 | * | 4/2005 | Smith et al. ................. 709/203 |
| 6,968,425 | B2 | * | 11/2005 | Hashimoto .................. 711/113 |
| 7,062,541 | B1 | * | 6/2006 | Cannon et al. .............. 709/219 |
| 7,209,976 | B2 | * | 4/2007 | Folkes et al. ................ 709/238 |
| 2003/0074430 | A1 | * | 4/2003 | Gieseke et al. .............. 709/221 |

OTHER PUBLICATIONS

Jim Handy, "The Cache Memory Book," Second Edition, 1998, pp. vii-229, Academic Press Limited, London, United Kingdom.

IEEE Standard for Scalable Coherent Interface (SCI), IEEE Std 1596-1992, 1992, pp. i-243, Institute of Electrical and Electronics Engineers, Inc., USA.

"UltraSPARC User's Manual, UltraSPARC-I, UltraSPARC-II," Jul. 1997, pp. iii-394, Sun Microsystems, USA.

* cited by examiner

*Primary Examiner*—Jack A Lane
(74) *Attorney, Agent, or Firm*—Caven & Aghevli LLC

(57) ABSTRACT

Use of an import cache and/or an export directory with an agent within to respond to requests for data. The import cache stores data that has been imported through the agent. The export directory stores information related to data that has been exported through the agent. Because the import cache and the export directory only store data that has passed through the agent, not all data transferred within a system are tracked by a single import cache or export directory.

30 Claims, 7 Drawing Sheets

HIERARCHICAL DIRECTORIES FOR CACHE COHERENCY IN A MULTIPROCESSOR SYSTEM

CROSS-REFERENCE TO RELATED APPLICATIONS

This application is a continuation of U.S. patent application Ser. No. 10/326,234 filed Dec. 19, 2002 now U.S. Pat. No. 7,130,969 entitled "Hierarchical Directories for Cache Coherency in a Multiprocessor System" and is related to the following U.S. patent applications and U.S. Patents:

(1) application Ser. No. 10/325,069, filed Dec. 19, 2002, entitled "FORWARD STATE FOR USE IN CACHE COHERENCY IN A MULTIPROCESSOR SYSTEM" now U.S. Pat. No. 6,922,756, issued Jul. 26, 2005;

(2) application Ser. No. 10/325,427, filed Dec. 19, 2002, entitled "SPECULATIVE DISTRIBUTED CONFLICT RESOLUTION FOR A CACHE COHERENCY PROTOCOL";

(3) application Ser. No. 10/324,711, filed Dec. 19, 2002, entitled "HIERARCHICAL VIRTUAL MODEL OF A CACHE HIERARCHY IN A MULTIPROCESSOR SYSTEM"; and (4) application Ser. No. 10/326,232, filed Dec. 19, 2002, entitled "NON-SPECULATIVE DISTRIBUTED CONFLICT RESOLUTION FOR A CACHE COHERENCY PROTOCOL" now U.S. Pat. No. 6,954,829, issued Oct. 11, 2005.

FIELD

The invention relates to cache memories. More particularly, the invention relates to hierarchical directories for use in maintaining cache coherency in a multiprocessor system.

BACKGROUND

As the number of cache memories in a complex system increases, so too does the latency associated with checking the cache memories for a valid, or most recent, copy of requested data. This is a result of a typically hierarchical memory structure, which requires that the request be transmitted through multiple layers of the memory structure.

For example, if a processor or a memory controller broadcasts a request for a copy of a block of data (e.g., a cache line), each cache memory in the system receives the request and checks for the requested data. Each cache memory must also respond to the source of the request. This request-response protocol can be very bandwidth intensive in complex systems.

One technique that has been used in these complex systems is a directory that tracks the location of the valid copy of the requested data. A single, centralized directory can be used. Use of a centralized directory quickly increases the complexity and bandwidth requirements for a system because every transaction must be reflected by the directory. Thus, the directory must be checked and/or updated for each request and each response even if the directory does not provide any relevant information related to the request or response. However, the centralized directory can become a bottleneck to performance as the complexity of the system increases because many devices must search the directory for each request for data.

BRIEF DESCRIPTION OF THE DRAWINGS

The invention is illustrated by way of example, and not by way of limitation, in the figures of the accompanying drawings in which like reference numerals refer to similar elements.

DETAILED DESCRIPTION

Figure 1:
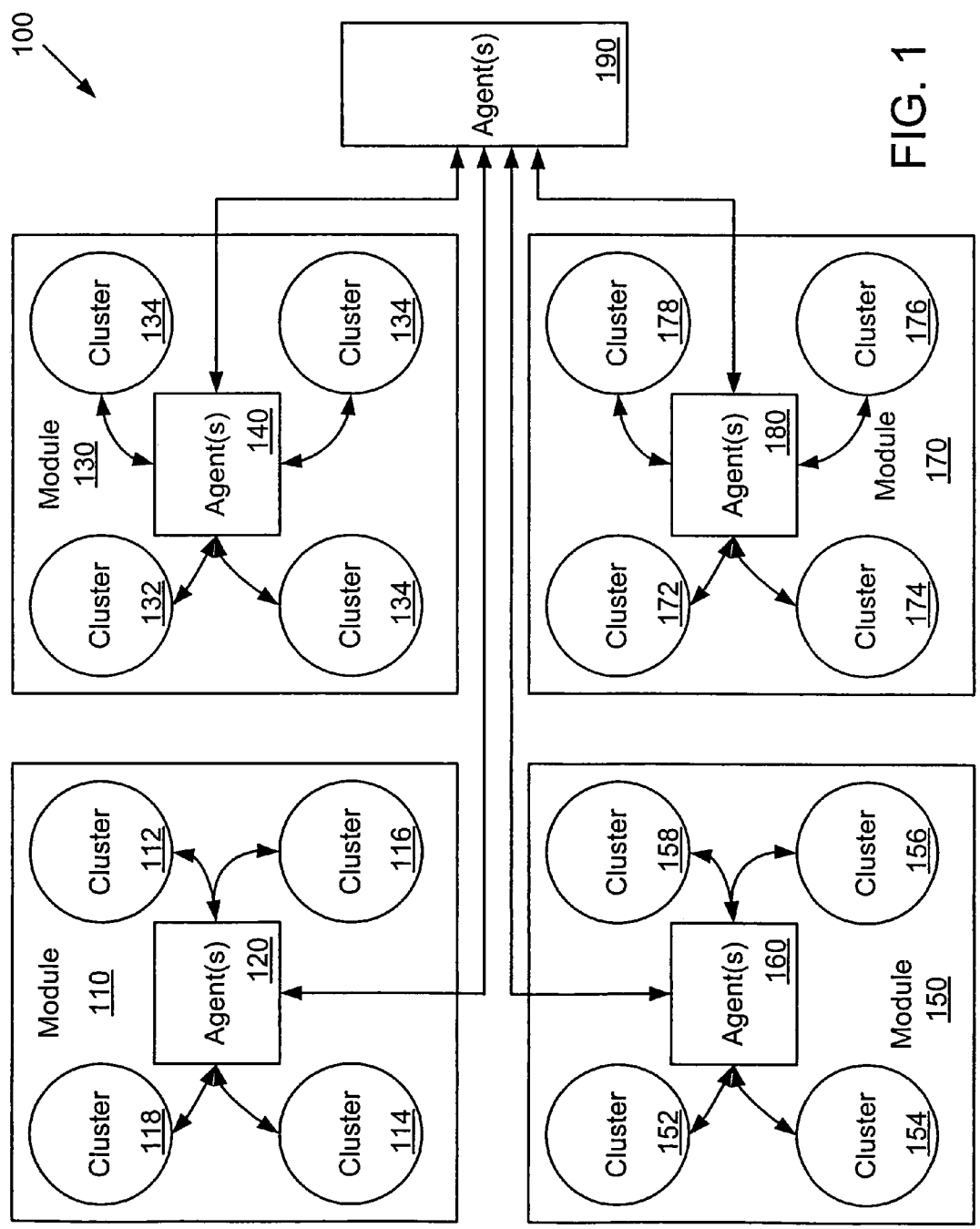
FIG. 1 is a conceptual illustration of one embodiment of a hierarchical system architecture using peer and home agents.

Techniques for use of hierarchical directories for cache coherency in a multiprocessor system are described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Cache Coherency Protocol Overview

In the description that follows, a cache coherency protocol is described that includes five states (Modified, Exclusive, Shared, Invalid, Forward), and is also referred to as the MESIF protocol. The F state permits a shared data to be transmitted from the current owning system component to the requesting system component without concern of multiple data copies received at the requesting system component, be it a read-only request or a read-for-ownership request.

In order to provide the cache coherency protocol several cache coherency protocol message types are described. As a preliminary matter, a summary of messages used for cache coherency is provided below. Not all of the messages described are required to provide a coherency protocol, but the group of messages can be used to provide a cache coherency protocol.

Request Messages

The following messages are requests for data/action from a requesting node. These messages are broadcast to all nodes of the system.

Port Read Line (PRL): This is a request for a copy of a data segment such as, for example, a cache line.

Port Read Invalidate Line (PRIL): This is a request for a copy of a data segment where the provider node's copy of the data is invalidated. This message can also be referred to as a "request for ownership."

Port Write Line (PWL): This message causes data (e.g., a modified cache line) to be written to memory. This message can also referred to as a "dirty eviction."

Port Invalidate Line (PIL): This message causes the state of designated data to change from Shared to Exclusive.

Port Write Invalidate Line (PWIL): This message causes data to be written to memory and the target copy of the data to be invalidated.

Response Messages

The following messages are messages from sent from Peer (i.e., Non-Home) nodes to the Requesting node in response to requests described above.

Invalid State Acknowledgement (IACK): This message is a response to a request (PRL, PRIL, PWL, PIL, PWIL) when the node sending the response has an invalid copy of the requested data or no copy of the requested data.

Shared State Acknowledgement (SACK): This message is a response to a request when the node sending the response has a copy of the requested data in the Shared state.

Acknowledgement of Data Received (DACK): This message acknowledges the receipt of requested data.

Conflict: This message indicates that there is a copending request for the requested cache line.

Data&State: This message provides the requested data as well as an indication of the state of the data in the Requesting node.

Messages to Home Node

These messages are transmitted to the Home node by a Peer node.

Read(Conflicts): This message requests data from the Home nodes and lists all conflicts, if any.

CNCL(Conflicts): This message is sent to the Home node in response to a hit in a Peer node and lists all conflicts, if any. This message cancels the Home node's prefetch operation.

Data(Conflicts): This message is used to write back data and lists all conflicts, if any.

Messages from the Home Node

These messages are sent from the Home node to the Peer and/or Requesting nodes.

Data: This message includes the requested data and can indicate the state of the data (M/E/F/S) to be used by the Requesting node.

Acknowledge (ACK): This message indicates that the requested data has been sent to the Requesting node.

Wait: This message causes the receiving node to pause before sending further messages.

Transfer (XFR): This message causes the receiving node to transfer data to the node indicated in the message.

Cache Protocol Overview

There are two basic schemes for providing cache coherence, snooping (now often called Symmetric MultiProcessing SMP) and directories (often called Distributed Shared Memory DSM). The fundamental difference has to do with placement and access to the meta-information, that is, the information about where copies of a cache line are stored.

For snooping caches the information is distributed with the cached copies themselves, that is, each valid copy of a cache line is held by a unit that must recognize its responsibility whenever any node requests permission to access the cache line in a new way. Someplace—usually at a fixed location—is a repository where the data is stored when it is uncached. This location may contain a valid copy even when the line is cached. However, the location of this node is generally unknown to requesting nodes—the requesting nodes simply broadcast the address of a requested cache line, along with permissions needed, and all nodes that might have a copy must respond to assure that consistency is maintained, with the node containing the uncached copy responding if no other (peer) node responds.

For directory-based schemes, in addition to a fixed place where the uncached data is stored, there is a fixed location, the directory, indicating where cached copies reside. In order to access a cache line in a new way, a node must communicate with the node containing the directory, which is usually the same node containing the uncached data repository, thus allowing the responding node to provide the data when the main storage copy is valid. Such a node is referred to as the Home node.

The directory may be distributed in two ways. First, main storage data (the uncached repository) is often distributed among nodes, with the directory distributed in the same way. Secondly, the meta-information itself may be distributed, keeping at the Home node as little information as whether the line is cached, and if so, where a single copy resides.

Snooping schemes rely on broadcast, because there is no single place where the meta-information is held, all nodes must be notified of each query, each node being responsible for doing its part to assure that coherence is maintained. This includes intervention messages, informing the Home node not to respond when another node is providing the data.

Snooping schemes have the advantage that responses can be direct and quick, but do not scale well because all nodes are required to observe all queries. Directory schemes are inherently more scalable, but require more complex responses, often involving three nodes in point-to-point communications.

Overview of the MESIF Protocol

The basic MESIF protocol described herein provides a snooping protocol without the limitations of a single, serializing bus. Like a snooping cache protocol, MESIF relies on nodes with cached copies of data to maintain coherence. The use of point-to-point links rather than a synchronous, centralized broadcast introduces the problem of time-warp—the fact that events appear to occur in a different order from the viewpoint of different nodes. The MESIF protocol correctly handles time-warp, recognizing when potential errors could result and making sure that they are handled correctly. The notion of a Home node is primarily to determine where the uncached copy reside, but the Home node can participate in every transaction—without being on the critical path—in order to resolve conflicts and time-warp issues. Because of the concurrent-broadcast nature of the scheme, MESIF achieves the low latency associated with snooping protocols, acquiring a cacheable copy of the data in most cases in the minimum possible latency: a single roundtrip request-response.

Ignoring for the time-warp problem, it is possible to achieve two-hop accesses when there is a unique cached copy in the system. Use of the F-state extends this capability to the common case where multiple copies exist.

The basic MESIF protocol is scalable, but the number of point-to-point connections a node requires grows with the number of nodes involved. The management of the growth of the nodes is accomplished hierarchically, by maintaining the appearance of a small collection of nodes, one of which is "the Home Node." For every address, each node is aware of such a collection of nodes—called its local cluster—with which it communicates, one of which is referred to as the Home Node. All other nodes in the cluster are referred to as Peer Nodes. For a given address, if a node contains the main storage for that address, it is referred to as the Home Node.

The MESIF protocol can be extended by defining the concept of a node recursively. That is, a node may contain one or more caches as well as some amount of main memory, but may also contain one or more nodes or clusters. A node appears as a single entity to other nodes through the mechanism of an agent, which has the same interface as any other node. That is, the agent may be seen by other nodes in its cluster as either a Peer Node or as the Home Node. If a compound node includes a node that is the Home Node, the compound node is referred to as the Home Node. Otherwise it is a Peer Node. Note that for a given address, because of the implicit hierarchy in the definition, multiple nodes may appear as "the Home Node," though only one node will appear as the Home node to any other node. Thus, the protocol is such that it is possible to ignore the distinction between agents and nodes, since both behave in the same way in the basic protocol.

The MESIF protocol involves broadcasting an initial request to all peer nodes as well as the Home Node. If a copy is cached in state E, F, or M, it is included in the response. A second message is then sent to the Home node, informing the Home Node that the request has been satisfied. If the requested line is uncached, or if only S-state copies exist, the second request sent to the Home node is used to confirm the previous request, which the Home node may have by now fetched from its memory. In either case, the Home node must respond to the second request (and to the first, though they can sometimes be combined) for purposes of synchronization and conflict resolution. Note that the Home node may have one or more caches, so it may respond to the initial request just like any other node.

Conceptually, requests emanate from the root of a tree. Requests are propagated down the tree and responses are collected and returned back up the tree. Unless the requesting node is the Home node, one of the leaf nodes is the Home node, and each of its parents, going up the tree appears as the Home node to nodes above it. Thus each leaf node responds as in the case of simple MESIF. Non-leaf nodes are agents for nodes below them. Thus a simple request/response involves the root sending requests to all its children (one of which is Home) and getting a response from each of them. Each of the children that are agents respond only after broadcasting to their subtree and collecting the responses.

Note that each node can see a different topology, with itself as the root of a tree. The topology for a given node is the same for all addresses, except that different child nodes will be the Home node for different addresses.

In one embodiment, the interconnection topology is a banyon network, that is, there is a unique designated path for communication between every pair of nodes in the system. Thus every node communicates with a set of other nodes, one of which appears to be the Home node (unless the node itself is the Home node). For routing purposes, each node operates as the root of a tree, with all the nodes it can communicate with being its children. If any of the child nodes are in fact agents, then they are not leaf nodes, but rather have an additional collection of nodes beneath them, and are a bridge to another cluster or group of clusters.

The response of an agent reflects the collective coherence data for the subtree for which it is the root. The agent can respond by broadcasting to the subtree, or it can retain information so that, for some requests, it can respond directly without having to broadcast to the subtree and collect the responses.

In one embodiment, the agent maintains usage information about all cache lines for which Home is outside the cluster. That is, the agent tracks lines that have been imported into the local cluster and are currently cached locally. The agent can track this information because all requests from within the cluster for these cache lines are routed through the agent if not handled within the cluster. Thus the cluster might have multiple copies of a cache line outstanding.

The Import Cache can also avoid broadcasting requests from elsewhere in the system to the agent's local cluster. The agent can use the import cache to determine that no nodes within the cluster have a copy of the cache line, the agent can respond with a NACK to a PRIL arriving from outside the cluster. Nodes can silently evict shared copies of a cache line, so the agent may not be aware that all copies have been evicted. Without loss of correctness, however, the agent broadcasts when the agent must invalidate any line not cached anywhere in the node. To avoid constant broadcasts of cache lines not cached locally, the agent may keep track of lines that are frequently written (causing invalidations) in other clusters so that the agent can short-circuit broadcasting to its local cluster.

In one embodiment, the agent maintains directory information about all cache lines for which Home is inside the cluster, but which have been cached outside the cluster. By maintaining complete information (for example, using a sparse cache directory), the agent can differentiate local requests that require broadcast outside the cluster. If an agent can determine that a line is not cached outside the Home cluster, the agent can respond with a NACK, avoiding the multiple broadcasts and long delay necessary before the agent can ascertain directly that no external cached copies exist. The Export Directory may also keep information about which nodes in its external cluster might have previously requested copies, and eliminate broadcast requests to nodes (clusters) that do not have a copy.

The Export Directory can also maintain a cached copy of line for which the Home node is within its local cluster. Thus the agent can respond to a PRL directly, supplying the data without broadcasting the request within the local cluster. Note that, like the Home node, the agent does not respond to a PRL if there is the possibility that another cluster might have the node in state E, F, or M.

Hierarchical System Overview

The cache coherency protocol described herein can be used to maintain a virtual model of a system, where the virtual model does not change as the system configuration changes. In general, the virtual model is based on the assumption that each node in the system can directly communicate with some number of other nodes in the system. In one embodiment, for each cache line, the address of the cache line is used to designate a node as the "home" node and all other nodes as "peer" nodes. The protocol specifies one set of messages for communication with the line's home node and another set of messages for communication with the line's peer nodes.

The home/peer node abstraction can be used in a hierarchical manner to extend the model of the system. Each node interacts with other nodes based on the home/peer node abstraction, but a node can be multiple processors and/or caches represented by an "agent" that handles messages for the multiple processors and/or caches. The home node for a cache line can consist of a tree of nodes, but must include within the tree the actual home node for the cache line.

The cache coherency protocol appears the same for simple nodes (i.e., nodes that include a single processor and/or cache memory) and for agents that operate for clusters of processors and/or cache memories. Except for delays, the protocol operates in the same manner for simple nodes and for agents. Because of the hierarchical nature of the model, the number of node addresses required does not increase as the system grows. Thus, the system size can be increased without the need for redesign of the system in general.

FIG. 1 is a conceptual illustration of one embodiment of a hierarchical system architecture using peer and home agents.

System 100 is illustrated with four modules having four clusters each; however, any number of clusters can be included in a module and any number of modules as well as any number of hierarchical layers can be supported.

Similarly, module 110 includes clusters 112, 114, 116 and 118, each of which includes multiple nodes. Each cluster is coupled with agent(s) 120, which includes peer agent and home agent functionality for each of the nodes in the cluster. In one embodiment, agent(s) 120 include a peer agent and a home agent to operate in the same manner as the peer agents and the home agents described above. The difference between the agents for the module is that the agents represent multiple clusters rather than the multiple nodes of a cluster.

Module 130 includes clusters 132, 134, 136 and 138 coupled with agent(s) 140. Module 150 includes clusters 152, 154, 156 and 158 coupled with agent(s) 160. Similarly, module 170 includes clusters 172, 174, 176 and 178 coupled with agent(s) 180. Each of modules 110, 130, 150 and 170 is coupled with agent(s) 190.

Figure 2:
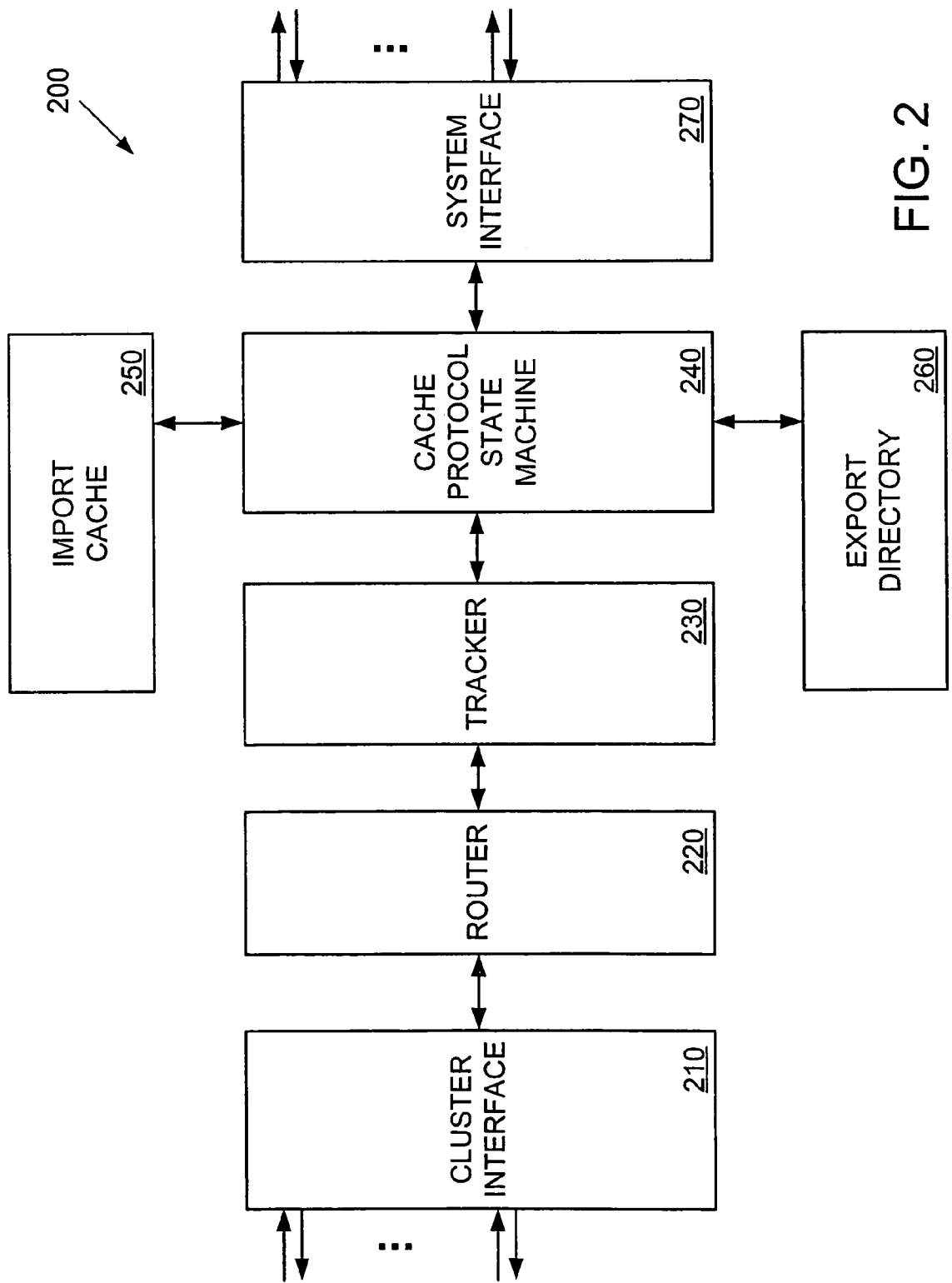
FIG. 2 is a block diagram of one embodiment of an agent.

FIG. 2 is a block diagram of one embodiment of an agent. In general, agent 200 operates as an interface between a cluster of nodes and multiple remote clusters of nodes that are represented by other agents. While specific blocks with specific associated functionalities are described with respect to FIG. 2, other configurations providing similar functionality can also be used.

Cluster interface 210 provides an interface between agent 200 and each of the nodes of a cluster. Cluster interface 210 provides two-way communications between agent 200 and a set of nodes (not shown in FIG. 2) represented by agent 200. For cache protocol transactions, agent 200 represents multiple nodes (or multiple other agents) in transactions with a system.

Cluster interface 210 is coupled with router 220 that routes data within agent 200 to and from the appropriate ports in cluster interface 210. Router 220 is coupled with tracker 230 that tracks requests and responses that pass through agent 200. Tracker 230 matches responses with requests and can either store or forward requests to be sent to other agents.

Cache protocol state machine 240 provides the functionality of the cache protocol described herein. Cache protocol state machine 240 is responsible for controlling the functionality of agent 200. Cache protocol state machine 240 generates, for example, responses to requests for data or forwards requests for data. System interface 270 is coupled with cache protocol state machine 240 and provides an interface with other nodes or agents (not shown in FIG. 2) that represent multiple remote nodes.

In one embodiment, agent 200 includes import cache 250 and export directory 260. In alternate embodiments, agent 200 can include either import cache 250 or export directory 260. In one embodiment, agent 200 is included in one or more of the nodes of a cluster represented by agent 200 rather than being a separate system element. In another alternate embodiment, import cache 250 and/or export directory 260 are provided by elements of the cluster, but not necessarily in agent 200.

In one embodiment, import cache 250 is coupled with cache protocol state machine 240; however, in alternate embodiments, import cache 250 is coupled with other components of agent 200. In general, import cache 250 stores copies of data that pass through agent 200 to the nodes of the cluster that agent 200 represents. In one embodiment, import cache 250 operates as a traditional cache memory. That is, if import cache 250 stores 10 cache lines, then the 10 most recent cache lines that pass through agent 200 to nodes of the cluster are stored by import cache 250.

In one embodiment, if the data sent to one of the nodes is in the F state, cache protocol state machine 240 causes import cache 250 to store the copy in the F state and agent 200 provides a copy to the requesting node in another state (e.g., the S state). Thus, the copy of the data in the F state that is used to satisfy subsequent requests for the data is at a higher level in the memory system hierarchy than if the F copy were provided to the requesting node. This reduces the latency associated with request for copy of a cached block of data.

Cache protocol state machine 240 can respond to requests with data retrieved from import cache 250. By responding to requests with data from import cache 250 rather than cache memories at lower system levels, the latency associated with a request for a block of data can be reduced.

In the previous example, agent 200 is one level above the requesting nodes. That is, agent 200 is coupled with the requesting nodes and directly represents the requesting nodes with respect to the system in which the nodes and agent 200 operate. Agent 200 and import cache 250 can operate in the same manner any number of levels above the requesting nodes. The primary difference would be that cluster interface 210 would be coupled with other agents that represent multiple nodes rather than the nodes themselves.

If agent 200 is two or more levels above the requesting nodes, import cache 250 can store the copy of data in the F state and provide a copy of the data in the, for example, S state to a lower level agent. The import cache of the lower level agent can store a copy of the data in the S state and the lower level agent can send a copy of the data in the S state to a requesting node.

In one embodiment, export directory 260 is coupled with cache protocol state machine 240; however, in alternate embodiments, export directory 260 is coupled with other components of agent 200. In general, export directory 260 stores information related to data that has been exported through agent 200 from nodes represented by agent 200.

In one embodiment, under control of cache protocol state machine 240, export directory 260 stores information for data having a home node in the cluster represented by agent 200 that has been exported to nodes of another cluster through agent 200. Thus, transfers of data between nodes of a cluster are not reflected by export directory 260. In one embodiment, export directory 260 includes an indicator of whether a particular block of data has been exported by agent 200. If so, the import caches of other nodes on the same system level as agent 200 can be searched for the requested data.

In alternate embodiments, entries in export directory 260 can include additional information, for example, an identifier of the node to which the exported data was sent. In such an embodiment, the target node and/or any agent(s) representing the target node can be searched for the requested data, which would focus the search more than would otherwise be possible and would allow system resources to be used more efficiently.

When an agent includes both an import cache and an export directory, the number of broadcasts required to request and provide blocks of data can be significantly reduced as compared to an agent without an import cache and an export directory. Further, because the export directory is selectively used with data that passes through the agent, not all data is tracked as with traditional directory structures, which increases the efficiency of the system by eliminating or reducing directory-induced bottlenecks.

Example Operation of an Agent Having an Import Cache

Figure 3:
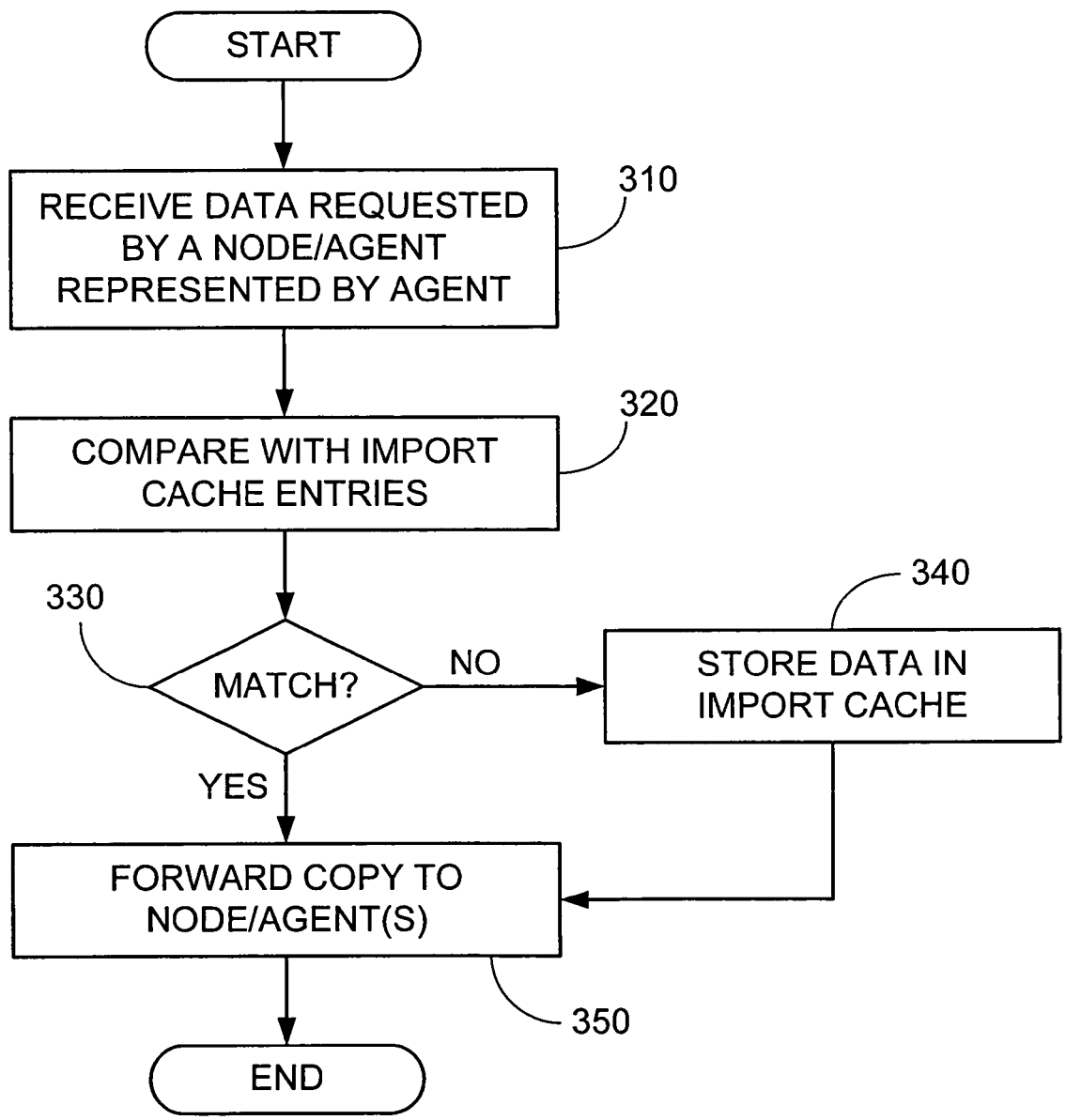
FIG. 3 is a flow diagram of one embodiment of a process for importing data through an agent having an import cache.

FIG. 3 is a flow diagram of one embodiment of a process for importing data through an agent having an import cache.

The process of FIG. 3 can be used by an agent whether the agent is representing a set of nodes or a set of agents that, in turn, represent nodes or other agents.

The agent receives data requested by a node/agent represented by the agent, 310. This can be, for example, a response message as described above, or any other type of message to provide data to a node/agent. The agent compares the incoming data with entries in the import cache, 320. Any type of cache lookup technique known in the art can be used to determine whether a match exists, 330.

If no match exists, the data is stored in the import cache, 340. In one embodiment, the data is store in the import cache in the F state if the incoming data is sent via a DataF message; however, data can be stored in the import cache in any state. If the import cache is full and a cache line must be evicted in order to store the incoming data, any eviction technique known in the art can be used.

A copy of the incoming data is forwarded to a requesting node/agent, 350. In one embodiment, copies cached in the import cache are provided to the node/agent in the S state even if the incoming data is sent via a DataF message. If the data is forwarded to another node, the same process can be used by the node to cache data and/or provide copies to requesting nodes.

Figure 4:
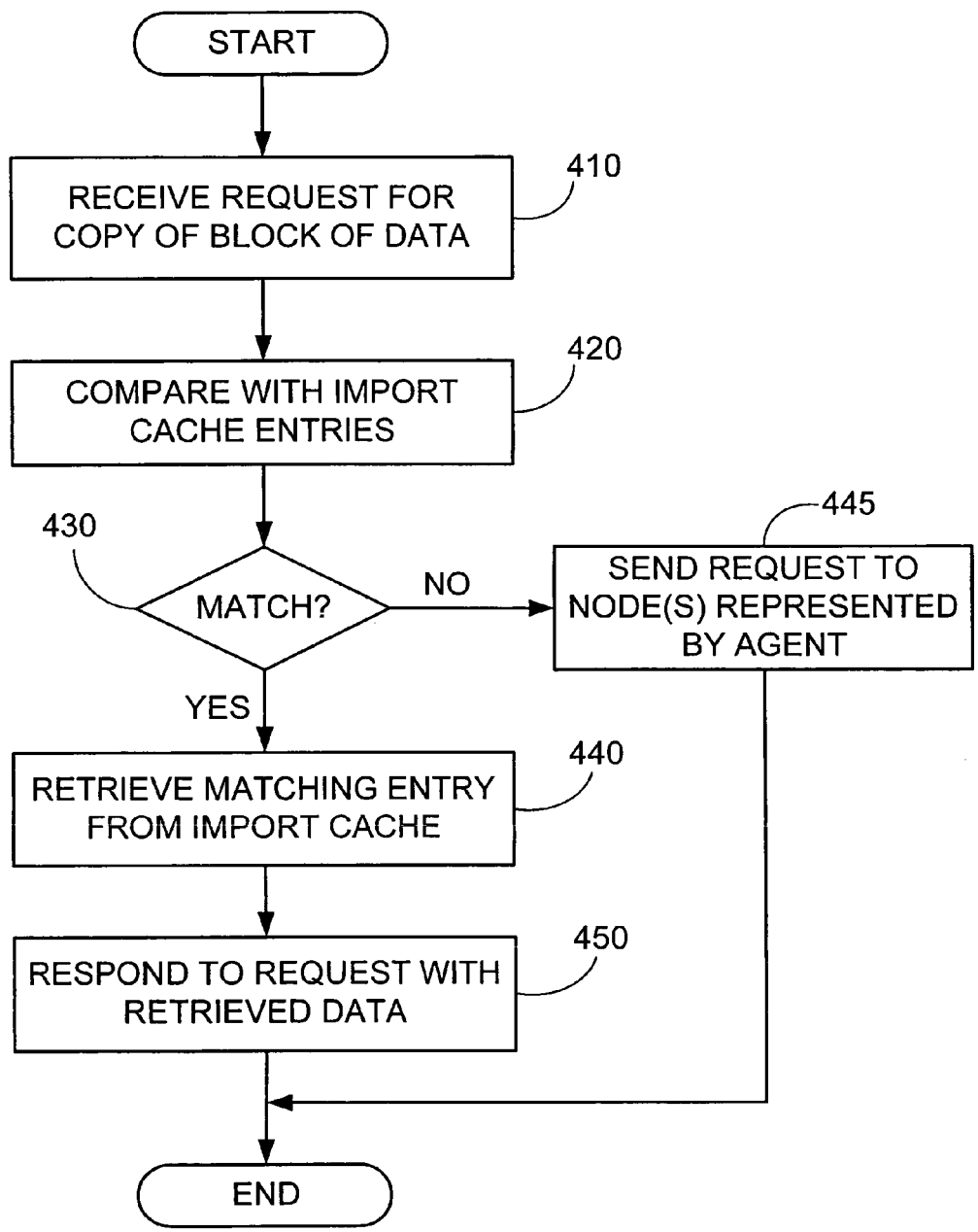
FIG. 4 is a flow diagram of one embodiment of a process for responding to a request for a block of data by an agent having an import cache.

FIG. 4 is a flow diagram of one embodiment of a process for responding to a request for a block of data by an agent having an import cache. A request for a copy of a block of data is received, 410. The request can come from a node or an agent. The request can be, for example, a PRIL message or PRL message, as described above. Any message requesting data can be used.

The request is compared to the import cache, 420. In one embodiment, the cache protocol state machine searches the import cache for the address or a portion of the address of the requested data. Any type of cache lookup technique known in the art can be used.

If the import cache returns a match, 430, the matching entry (or the relevant data from the matching entry) is retrieved from the import cache, 440. If the import cache returns a miss, indicating no match, the request for the data is sent to the nodes and/or agents represented by the agent receiving the request, 445. In one embodiment, the cache protocol state machine forwards the request to the node/agent(s) through the tracker, router and cluster interface as illustrated above with respect to FIG. 2.

If a matching entry is retrieved, 440, the data retrieved from the matching entry is used to respond to the request. In one embodiment, the cache protocol state machine generates a response message, for example, a DataF message or a DataS message. The response message is sent through the system interface as illustrated above with respect to FIG. 2.

Note that if a request is received from the cluster the agent represents that already has an outstanding request to the same cache line that is pending responses from the other agents, that request is coalesced by the tracker so that at any time, only one request to the same cache line emanates from the agent.

Example Operation of an Agent Having an Export Directory

Figure 5:
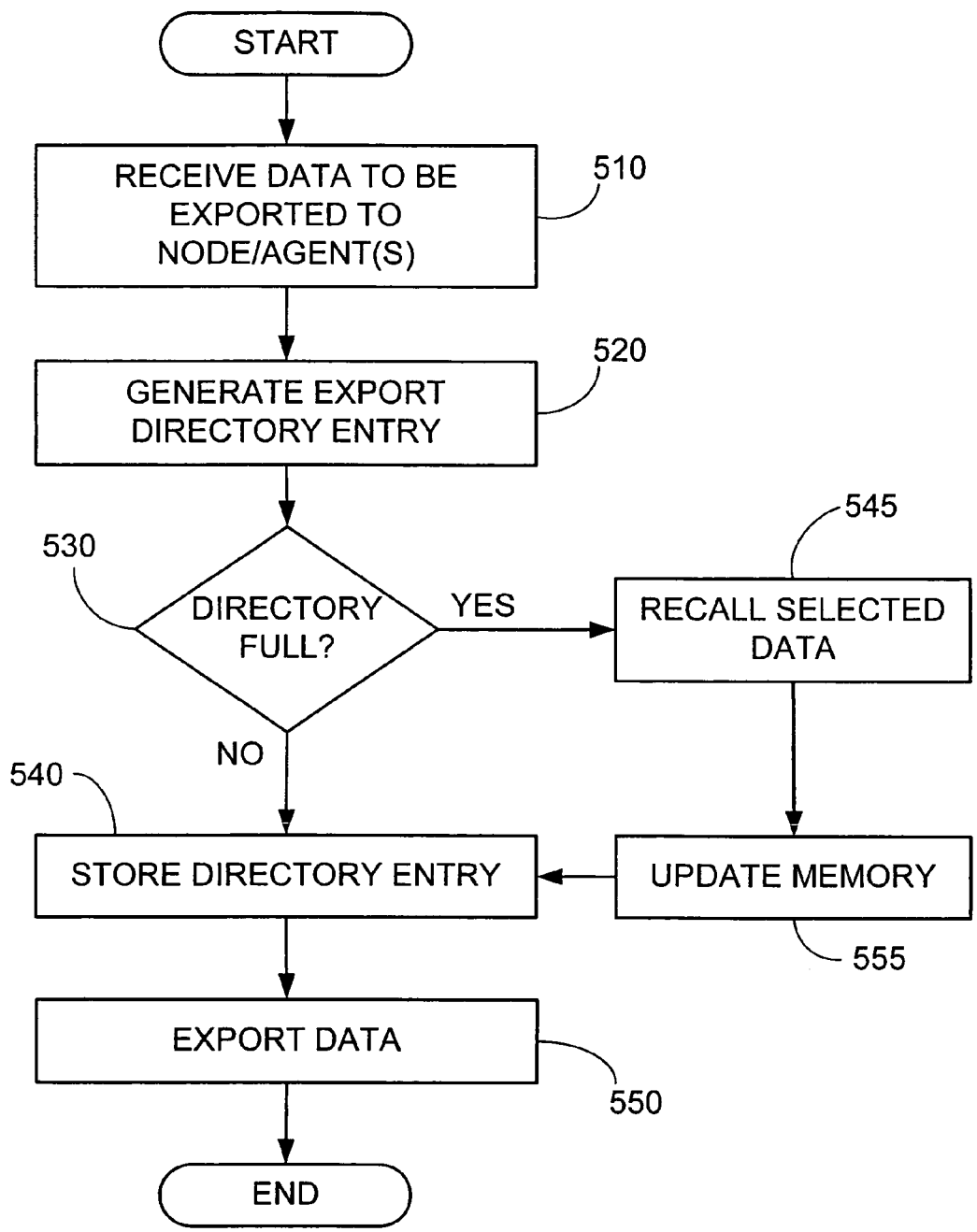
FIG. 5 is a flow diagram of one embodiment of a process for exporting data through an agent having an export directory.

FIG. 5 is a flow diagram of one embodiment of a process for exporting data through an agent having an export directory. An agent receives data to be exported to a node or another agent, 510. In one embodiment, the agent receives a response message that transfers data, for example, a DataF message, from a node or another agent.

An export directory entry is generated, 520. In one embodiment, the cache protocol state machine generates the information to be stored in the export directory. The information can be, for example, a flag indicating that the data has been exported, an identifier of the target node, an identifier of an agent representing the target node and/or any other information that can be useful for tracking exported data.

If the directory is full, 530, a previously exported block of data is recalled, 545, from the destination of the data and written back to memory, 555. Data is recalled when the directory is full so that all exported data can be tracked. After the data is written back to memory, the new directory entry is stored, 540. In one embodiment, the directory entry is stored by the cache protocol state machine writing the data of the directory entry to the specified directory location. Any least-recently-used policy or other replacement policy can be used to select which directory entry to be recalled.

If the directory is not full, 530, the new directory entry is stored, 540. The data is exported from the agent, 550. In one embodiment, the cache protocol state machine transmits the exported data through the system interface to the target node or agent.

Figure 6:
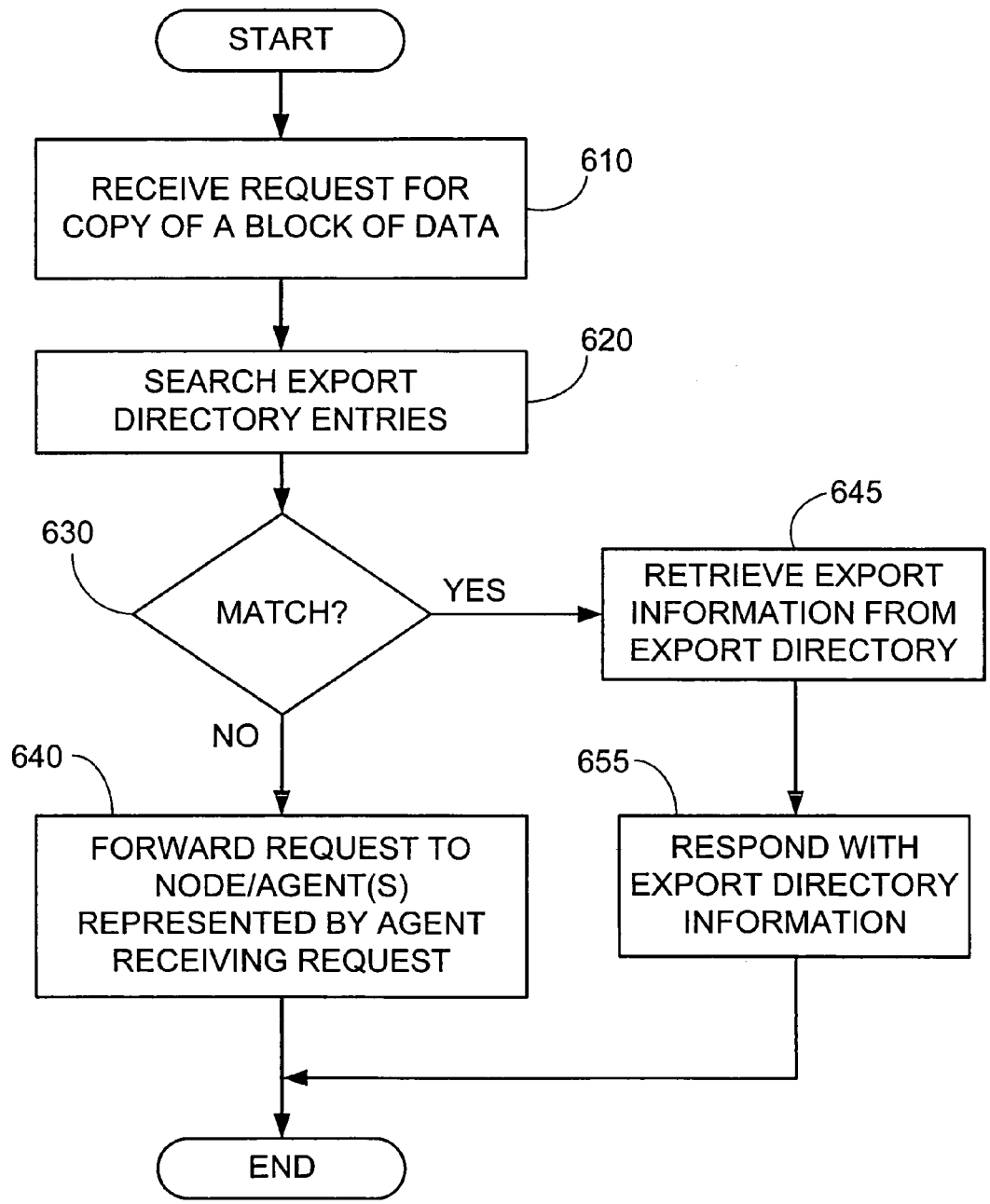
FIG. 6 is a flow diagram of one embodiment of a process for responding to a request for a block of data by an agent having an export directory.

FIG. 6 is a flow diagram of one embodiment of a process for responding to a request for a block of data by an agent having an export directory. A request for a copy of a block of data is received by an agent, 610. The request can be, for example, a PRL message or a PRIL message.

The export directory is searched for a match, 620. In one embodiment, the cache protocol state machine searches the export directory to determine whether an address (or partial address) matching the request is indicated as previously exported by the export directory.

If a match is found, 630, the export directory information is retrieved from the export directory, 645. In one embodiment, the cache protocol state machine retrieves relevant information from the export directory that matches the requested data. The export directory information is used to direct the request message, 655. In one embodiment, the cache protocol state machine determines the agent/node to which the data has been exported and directs the request message to that agent/node rather than broadcasting the request to all agents/nodes in the system.

If a match is not found, 630, the request is limited to the nodes/agents of the local cluster, 640. Because no match exists in the export directory, the requested data has not been exported from the local cluster. Therefore, a node/agent of the local cluster can provide the requested data and broadcasting the request message to other nodes/agents outside of the local cluster is unnecessary.

One Embodiment of A Multiprocessor System

Figure 7:
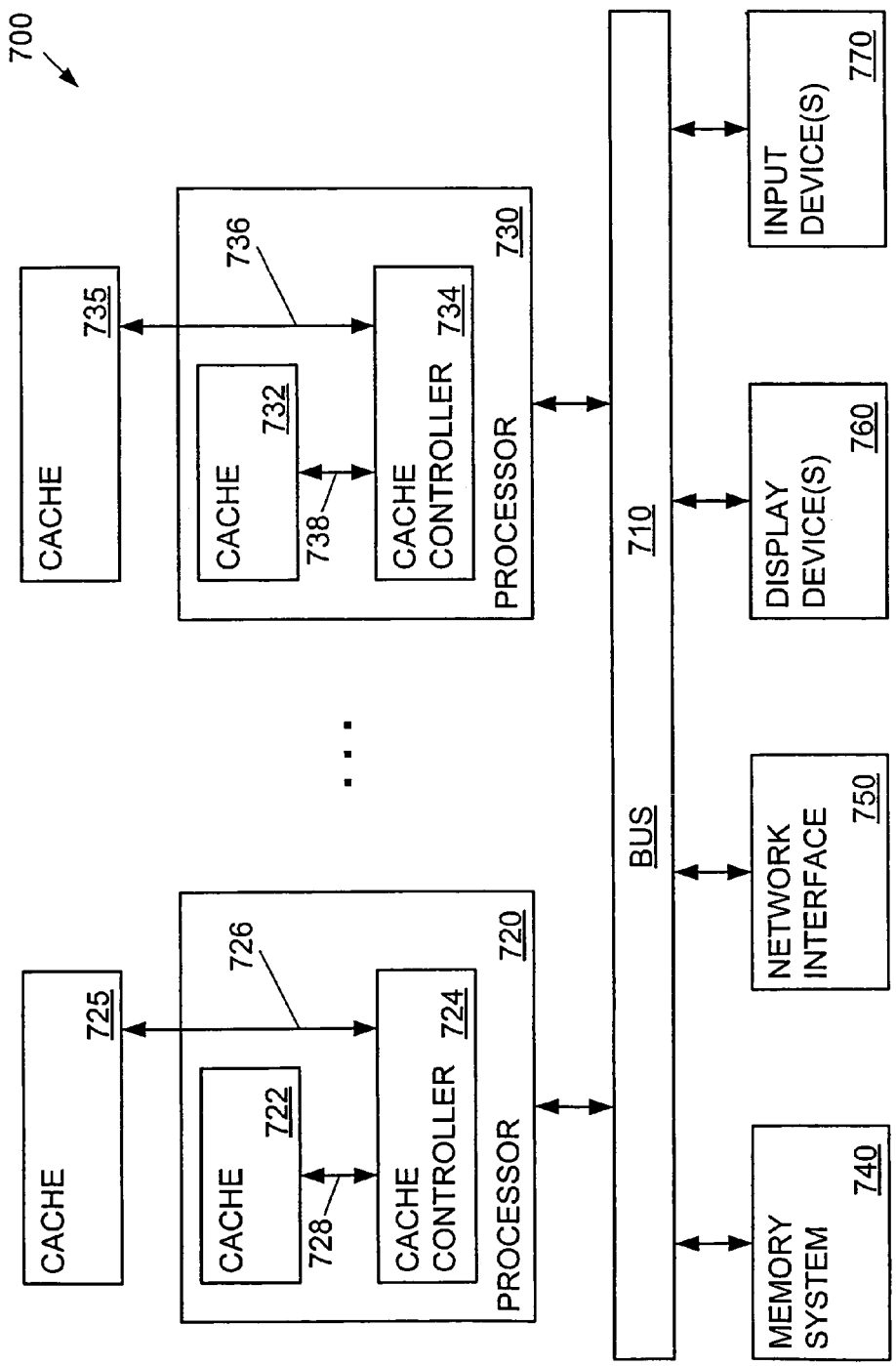
FIG. 7 is a block diagram of one embodiment of a multiprocessor system.

FIG. 7 is one embodiment of a multiprocessor system. Multiprocessor system 700 is intended to represent a range of systems having multiple processors, for example, computer systems, real-time monitoring systems, etc. Alternative multiprocessor systems can include more, fewer and/or different components. In certain situations, the cache management techniques described herein can be applied to both single processor and to multiprocessor systems. Processor 720 and related caches can, for example, operate as a node as described above. Other collections of one or more caches and/or processors can also operate as nodes.

Multiprocessor system 700 includes bus system 710 or other communication device(s) to communicate information. Bus system 710 can include any number of buses and associated interconnection circuitry, for example, bus bridges. Processor 720 is coupled with bus system 710 to process information. Processor 720 can include cache memory 722, for example a level zero (L0) cache memory, and cache controller 724. In one embodiment, processor 720 is also coupled with cache 725, which can be any type of cache memory. In an alternate embodiment, cache 725 can be coupled with bus system 710. Other types of processor-cache configurations can also be used.

In one embodiment, cache controller 724 is coupled with cache memory 722 via cache memory interface 728, which can be, for example, a bus internal to processor 720. Cache controller is coupled with cache memory 725 via cache interface 726, which provides an interface between processor 720 and an external cache memory.

Multiprocessor system 700 further includes processor 730 with cache memory 732 and cache controller 734. Cache controller 734 is coupled with cache memory 732 via cache interface 738. Similarly, cache controller 734 is coupled with cache memory 735 via cache interface 736. In one embodiment, cache memory 735 is coupled with processor 730.

While multiprocessor system 700 is illustrated with two processors, multiprocessor system 700 can include any number of processors and/or co-processors. Multiprocessor system 700 further includes memory system 740 coupled with bus system 710. Memory system 740 can include any combination of dynamic (e.g., random access memory) and static (e.g., read-only memory, CD-ROM, disk storage, flash memory) memory devices and associated drives, where appropriate. The memory devices of memory system 740 are used to store information and instructions to be executed by processors of multiprocessor system 700. Memory system 740 also can be used to store temporary variables or other intermediate information during execution of instructions by the processors.

Instructions can be provided to memory system 740 from a static or remote storage device, such as magnetic disk, a read-only memory (ROM) integrated circuit, CD-ROM, DVD, via a remote connection that is either wired or wireless, etc. In alternative embodiments, hard-wired circuitry can be used in place of or in combination with software instructions. Thus, execution of sequences of instructions is not limited to any specific combination of hardware circuitry and software instructions.

Multiprocessor system 700 further includes network interface 750 to provide access to a network, such as a local area network and/or the Internet. Network interface 750 can provide wireless and/or wired network interfaces, which can include communication of instructions to and/or from remote electronically-accessible media. An electronically-accessible medium includes any mechanism that provides (i.e., stores and/or transmits) content (e.g., computer executable instructions) in a form readable by an electronic device (e.g., a computer, a personal digital assistant, a cellular telephone).

For example, a machine-accessible medium includes read only memory (ROM); random access memory (RAM); magnetic disk storage media; optical storage media; flash memory devices; electrical, optical, acoustical or other form of propagated signals (e.g., carrier waves, infrared signals, digital signals).

Multiprocessor system 700 can also include display device 760, such as a cathode ray tube (CRT) or liquid crystal display (LCD), to display information. Input device(s) 770, including, for example, a keyboard having alphanumeric and other keys, is typically coupled to bus 710 to communicate information and command selections to processors 720 and/or 730. Another type of user input device is a cursor control device, such as a mouse, a trackball, or cursor direction keys to communicate direction information and command selections to processors 720 and 730 and to control cursor movement on display device 760.

CONCLUSION

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. An apparatus comprising:
an import cache;
an export directory; and
a control circuit coupled with the import cache and the export directory, the control circuit to analyze data passing to external entities, wherein the control circuit causes a copy of a block of data transmitted from a first entity to a second entity represented by an agent to be stored in the import cache, and further wherein the control circuit generates an entry to the export directory in response to data being transmitted from a third entity represented by the agent and a fourth entity.

2. The apparatus of claim 1 wherein the first entity and the fourth entity comprise the same entity.

3. The apparatus of claim 2 wherein the second entity and the third entity comprise the same entity.

4. The apparatus of claim 1 wherein the first entity and the fourth entity comprise one or more agents.

5. The apparatus of claim 1 wherein the second entity and the third entity comprise one or more agents.

6. The apparatus of claim 1 wherein the second entity and the third entity comprise one or more nodes.

7. The apparatus of claim 1 wherein the block of data comprises a cache line.

8. The apparatus of claim 1 wherein one of the external entities comprises a node having a processor coupled with a cache memory and a non-cache memory.

9. The apparatus of claim 1 wherein the first entity and the second entity are not represented by the agent.

10. The apparatus of claim 1 wherein the control circuit responds to requests for data by retrieving information from the import cache and/or the export directory.

11. An apparatus comprising:
an export directory; and
a control circuit coupled with the export directory, the control circuit to analyze data passing to external entities, wherein the control circuit generates an entry to the export directory in response to data being transmitted from a first entity represented by an agent and a second entity.

12. The apparatus of claim 11 wherein the first entity comprises an agent.

13. The apparatus of claim 11 wherein the second entity comprises an agent.

14. The apparatus of claim 11 wherein the second entity comprises a node.

15. The apparatus of claim 11 wherein the block of data comprises a cache line.

16. The apparatus of claim 11 wherein the control circuit selectively forwards requests for data based on information from the export directory.

17. An apparatus comprising:
an import cache; and
a control circuit coupled with the import cache to analyze data passing to external entities, wherein the control circuit causes a copy of a block of data transmitted from a first entity to a second entity represented by an agent to be stored in the import cache.

18. The apparatus of claim 17 wherein the second entity comprises a node.

19. The apparatus of claim 17 wherein the block of data comprises a cache line.

20. The apparatus of claim 17 wherein one or of the external entities comprises a node having a processor coupled with a cache memory and a non-cache memory.

21. The apparatus of claim 17 wherein the control circuit responds to requests for data by retrieving information from the import cache.

22. A system comprising:
a plurality of system entities;
an agent coupled with the plurality of system entities having an export directory with entries to indicate information related to a block of data transmitted from one of the plurality of system entities to a first remote system entity, the agent further having an import cache to store a copy of a block of data transmitted to one of the plurality of system entities from a second remote system entity.

23. The system of claim 22 wherein the exported block of data comprises a cache line.

24. The system of claim 22 wherein the imported block of data comprises a cache line.

25. The system of claim 22 wherein the plurality of system entities comprises one or more nodes.

26. The system of claim 25 wherein the plurality of system entities further comprises one or more agents, each of which represent multiple nodes and/or agents.

27. The system of claim 22 wherein each of the plurality of nodes comprises:
a processor;
a cache memory coupled with the processor; and
a non-cache memory coupled with the processor;
wherein the node responds to a request for data with data from the cache memory if the node is not a home node for a requested data and the node responds to the request for data with data from the non-cache memory if the node is a home node for the requested data.

28. A method comprising:
receiving, with an agent that represents multiple system entities, a response message to provide data to a requesting system entity from a source system entity;
storing, in an export directory, information related to the response message;
receiving, with an agent that represents multiple system entities, a response message to provide data to a requesting system entity represented by the agent; and
storing, in an import cache, a copy of the data.

29. The method of claim 28 further comprising forwarding the response message to the requesting system entity.

30. The method of claim 28 wherein the copy of the data stored in the import cache is stored in a state indicated by the response message.

* * * * *